(12) United States Patent
Tibbe (10) Patent No.: US 12,262,841 B2
(45) Date of Patent: Apr. 1, 2025

(54) COFFEE MACHINE

(71) Applicant: KONINKLIJKE PHILIPS N.V., Eindhoven (NL)

(72) Inventor: Tim Gerard Tibbe, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 901 days.

(21) Appl. No.: 17/414,772

(22) PCT Filed: Dec. 11, 2019

(86) PCT No.: PCT/EP2019/084701
§ 371 (c)(1),
(2) Date: Jun. 16, 2021

(87) PCT Pub. No.: WO2020/126755
PCT Pub. Date: Jun. 25, 2020

(65) Prior Publication Data
US 2022/0061584 A1    Mar. 3, 2022

(30) Foreign Application Priority Data
Dec. 17, 2018  (EP) ..................... 18212942

(51) Int. Cl.
*A47J 31/52*   (2006.01)
*A23F 5/26*   (2006.01)
(Continued)

(52) U.S. Cl.
CPC .............. *A47J 31/52* (2013.01); *A23F 5/26* (2013.01); *A47J 31/34* (2013.01); *A47J 31/42* (2013.01);
(Continued)

(58) Field of Classification Search
CPC .... A47J 31/4489; A47J 31/4428; A47J 31/42; A47J 31/34; A47J 31/468; A47J 31/461; A47J 31/52; A23F 5/26
See application file for complete search history.

(56) References Cited

U.S. PATENT DOCUMENTS 4,520,716 A    6/1985  Hayes
5,498,757 A *  3/1996  Johnson ................. A47J 31/54
                                                99/323.1
(Continued)

FOREIGN PATENT DOCUMENTS

CN    101181134 A    5/2008
EP    3505024 A1     7/2019
(Continued)

OTHER PUBLICATIONS

Extended European Search Report issued in connection with corresponding EP Application No. 18212942.9 dated Apr. 24, 2019.
(Continued)

*Primary Examiner* — Brian W Jennison
(74) *Attorney, Agent, or Firm* — Maschoff Brennan (57) ABSTRACT

A coffee machine is for preparing an espresso coffee drink, but it also enables filtered coffee to be produced. An external water delivery nozzle is provided, and it provides water to a coffee jug comprising a filter holder for holding a coffee filter and contained coffee grinds. The coffee jug and the external water delivery nozzle can be coupled and decoupled.

15 Claims, 6 Drawing Sheets

(51) Int. Cl.
    *A47J 31/34*    (2006.01)
    *A47J 31/42*    (2006.01)
    *A47J 31/44*    (2006.01)
    *A47J 31/46*    (2006.01)

(52) U.S. Cl.
    CPC ......... *A47J 31/446* (2013.01); *A47J 31/4489* (2013.01); *A47J 31/468* (2018.08)

(56) References Cited

U.S. PATENT DOCUMENTS

| | | | |
|---|---|---|---|
| 7,946,219 B2 | 5/2011 | Marconi | |
| 2014/0069279 A1* | 3/2014 | Upston | A47J 31/4403 99/283 |
| 2014/0242226 A1* | 8/2014 | Buttiker | A47J 31/467 426/433 |
| 2015/0033947 A1 | 2/2015 | Van Der Kamp et al. | |
| 2017/0127876 A1* | 5/2017 | Van Eeden | A47J 31/4485 |

FOREIGN PATENT DOCUMENTS

| | | |
|---|---|---|
| JP | 2006-014922 A | 1/2006 |
| RU | 2579939 C2 | 4/2016 |
| WO | 9631125 A1 | 10/1996 |
| WO | 2012151629 A1 | 11/2012 |

OTHER PUBLICATIONS

International Search Report and Written Opinion issued in connection with corresponding PCT Application No. PCT/EP2019/084701 dated Mar. 30, 2020.

* cited by examiner

COFFEE MACHINE

CROSS-REFERENCE TO RELATED APPLICATIONS

The present application is a U.S. National Phase application under 35 U.S.C. § 371 of International Application No. PCT/EP2019/084701, filed on Dec. 11, 2019, which claims the benefit of European Patent Application No. 18212942.9, filed on Dec. 17, 2018. These applications are hereby incorporated by reference herein.

FIELD OF THE INVENTION

This invention relates to coffee machines, and in particular to espresso coffee machines.

BACKGROUND OF THE INVENTION

An espresso coffee machine typically comprises a brewing chamber in which coffee grinds are provided. The machine compresses the coffee grinds, and passes hot water through the compressed coffee grinds to create an espresso coffee drink.

A fully automatic espresso machine further comprises a grinder, so that the machine performs the full function of coffee beans grinding, compression and espresso drink formation.

These appliances typically also provide the function of automated cappuccino brewing with frothed milk. In most cases, steam is used for heating and frothing the milk, in a similar manner to a barista.

This type of machine is only suitable for making espresso and cappuccino drinks. However, drip filtered coffee is similarly popular.

Commercial coffee machines are able to provide all different types of coffee drink as well as other drinks such as tea, hot chocolate, hot milk etc. These are however high cost machines which are not suitable for a domestic market. For example, JP 2006-14922 discloses a commercial coffee machine which includes an espresso machine and a filter coffee machine integrated side-by-side.

US 2015/0033947 discloses an appliance with multiple accessories. A coffee pod accessory or a drip filtered coffee accessory are provided.

There remains a need for a full function coffee machine which is able to prepare espresso (and optionally also cappuccino) drinks, but also drip filtered coffee, but without significantly increasing the cost, complexity, difficulty of use, or size of the appliance.

WO 96/31125 discloses a milk frothing system which is part of an espresso coffee maker. The coffee maker includes a hot water spigot which may be used to discharge hot water into an airpot.

WO 2012/151629 discloses a coffee making device that includes a removable water tank. A steam wand is used to provide a steam output for milk frothing.

SUMMARY OF THE INVENTION

The invention is defined by the claims.
According to examples in accordance with an aspect of the invention, there is provided a coffee machine comprising:
  a water supply;
  a water heater for heating water;
  a pump for pumping the heated water;
  a brewing chamber for receiving coffee grinds and brewing coffee using hot water delivered by the pump;
  an external water delivery nozzle for delivering water from the pump which has not passed to the brewing chamber; and
  a coffee jug comprising a filter holder for holding a coffee filter and contained coffee grind,
  wherein the coffee jug and the coffee machine comprise complementary coupling features to allow the coffee jug to be coupled to and decoupled from the external water delivery nozzle.

This coffee machine is for producing espresso coffee, based on the use of a brewing chamber in which the coffee grinds are received. However, in combination with a coffee jug with a filter holder, the machine is also able to produce filter coffee. The coffee filter is external to the coffee machine, so the additional filter coffee function does not add space or complexity to the machine. The same water heater and same water supply, pump and water heater is used for all of the different coffee types.

The use of a coffee jug for making filter coffee does not require any adaptation to the coffee machine by the user, other than selecting a filter coffee mode, so that the coffee machine can control the delivery of hot water from the pump directly to the external water delivery nozzle.

The coffer machine preferably comprises a controller, which is adapted to implement a filter coffee mode of operation and an espresso coffee mode of operation. The controller controls the pump to control the water delivery rate and/or controls the heater to control the temperature. In this way, water is delivered to the external water delivery nozzle during the filter coffee mode and water is delivered to the brewing chamber during the espresso coffee mode, at a different water delivery rate and/or different temperature.

Thus, the water delivery rate and/or the water temperature are adapted according to the mode of operation, so that the coffee preparation is optimal for espresso coffee generation or for filter coffee generation.

Thus, in a first aspect, the controller may be adapted, in a filter coffee mode of operation, to control the pump to deliver a desired amount of water, to the external water delivery nozzle, at an appropriate water delivery rate. Thus, the water delivery rate from the external water delivery nozzle is actively controlled to be optimal for filter coffee generation.

The controller is for example adapted, in the filter coffee mode of operation, to control the pump to deliver a pulsed water flow to the external water delivery nozzle. This pulsed water flow is used to achieve a lower water delivery rate than a continuous flow. This allows the pump to provide a flow rate at a pressure that is suitable for making a drip filtered coffee drink.

The controller may be adapted, in an espresso coffee mode of operation, to control the pump to deliver water, to the brewing chamber, at a higher water delivery rate than during the filter coffee mode of operation. Thus, the controller is used to actively control the water delivery rate to be optimal for espresso coffee generation during an espresso coffee mode and optimal for filter coffee preparation in a filter coffee mode.

For the espresso coffee mode of operation, the water delivery rate is for example above 3 ml/s, such as in the range 3 ml/s to 5 ml/s, and for the filter coffee mode of operation the water delivery rate is for example below 2 ml/s such as in the range 1 ml/s to 2 ml/s.

In a second aspect, the controller is adapted, in a filter coffee mode of operation, to control the heater to deliver water at an appropriate temperature. Thus, the water temperature delivered from the external water delivery nozzle is actively controlled to be optimal for filter coffee generation.

The controller may be adapted, in an espresso coffee mode of operation, to control the heater to deliver water, to the brewing chamber, at a higher temperature than during the filter coffee mode of operation. Thus, the controller is used to actively control the water temperature to be optimal for espresso coffee generation during an espresso coffee mode and optimal for filter coffee preparation in a filter coffee mode.

For the espresso coffee mode of operation, the temperature is for example above 95 degrees (e.g. 100 degrees) and for the filter coffee mode of operation the temperature is for example below 95 degrees (e.g. 90 degrees).

The external water delivery nozzle may comprise the coupling feature for coupling to the coffee jug. This may facilitate accurate alignment between coffee jug and external water delivery nozzle.

The filter holder of the coffee jug may comprise the coupling feature for coupling to the external water delivery nozzle. For example, the filter holder may be attached to the coffee machine, and the jug may simply sit beneath as a collection vessel. This means only a small and light component needs to be fitted to the coffee machine.

The coffee machine preferably comprises a bean-to-cup espresso machine comprising a bean grinder. In this way, the functionality of a fully automated full function espresso coffee machine is extended to include a real drip filtered coffee function, where the drip filter coffee can be made from freshly ground beans.

The bean grinder for example has an outlet, which can be configured to deliver coffee grinds to the brewing chamber. In addition or alternatively, the outlet of the bean grinder may be configured to deliver coffee grinds to an external coffee grinds output, accessible from the exterior of the coffee machine. In this way, the integrated coffee grinding capability of the machine may be used to grinds coffee beans for other use, e.g. for aforementioned drip filtered coffee function or a stand-alone drip filter coffee machine or other coffee machine. In this respect, it will be clear that the external coffee grinds output may advantageously be applied in other coffee machines, without the limitations of present claim 1. Therefore, according to an aspect of the invention, a coffee machine may be provided, comprising a water supply, a water heater for heating water, a pump for pumping the heated water, a brewing chamber for receiving coffee grinds and brewing coffee using hot water delivered by the pump, a bean grinder with an outlet configured to deliver coffee grinds to the brewing chamber and/or to an external grinds output of the coffee machine.

The water heater is preferably further controllable to generate steam. Alternatively, an additional heater may be provided to generate steam. The external hot water output enables drip-filtered coffee to be made in addition to the internally made espresso coffee, and the steam output enables heating and frothing of milk to enable a cappuccino (or latte or other drinks) to be made.

For this purpose, the coffee machine further comprises a steam outlet. The steam outlet may be separate to the external water delivery nozzle, or it may be the external water delivery nozzle (which can thus deliver steam or hot water).

The coffee machine preferably further comprises a milk frothing unit for coupling to the steam outlet.

The invention also provides a coffee jug comprising:
a vessel; and
a filter holder for holding a coffee filter and contained coffee grind; and
a coupling feature adapted to allow the coffee jug to be connected to an external water delivery nozzle of an espresso coffee machine.

BRIEF DESCRIPTION OF THE DRAWINGS

Examples of the invention will now be described in detail with reference to the accompanying drawings, in which.

DETAILED DESCRIPTION OF THE EMBODIMENTS

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figs are merely schematic and are not drawn to scale. It should also be understood that the same reference numerals are used throughout the Figs to indicate the same or similar parts.

The invention provides a coffee machine for preparing an espresso coffee drink, but which also enables filtered coffee to be produced, such as drip filtered coffee. An external water delivery nozzle is provided, and it provides water to a coffee jug comprising a filter holder for holding a coffee filter and contained coffee grinds (i.e. ground coffee beans). The coffee jug and the external water delivery nozzle can be coupled and decoupled.

Figure 1A:
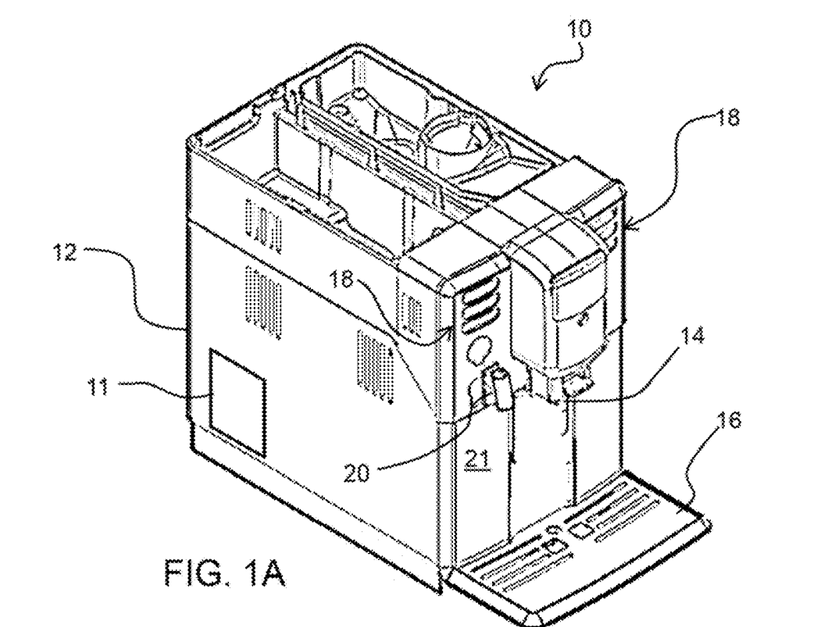
FIGS. 1A and 1B show a full function espresso coffee machine.
Figure 1B:
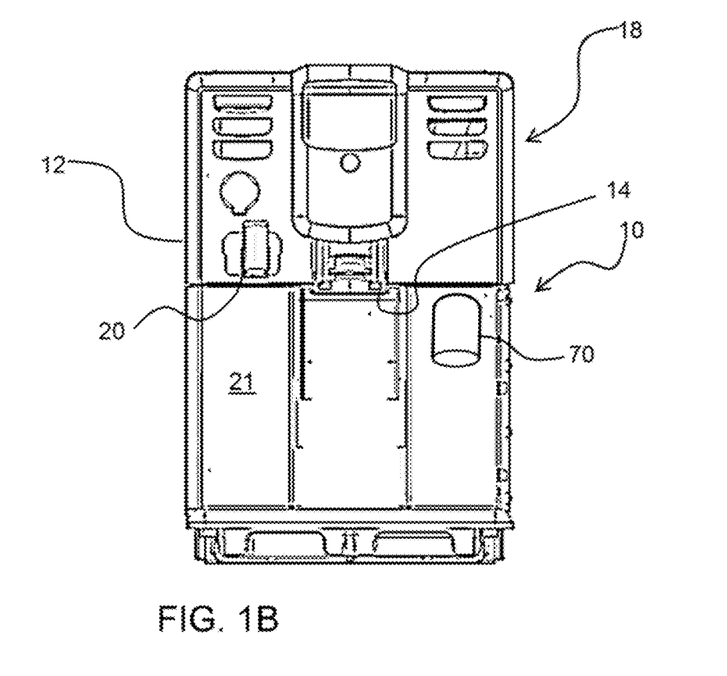

FIGS. 1A and 1B shows a drinks machine 10 in the form of an espresso coffee machine. FIG. 1A shows a perspective view and FIG. 1B shows a view from in front. This example is a bean-to-cup machine, although other options are possible as mentioned further below.

It comprises a main body 12, which houses a water reservoir, a water heater and a reservoir for receiving coffee beans. There is an internal grinding mechanism for creating coffee grind, a brewing chamber or brew group for receiving the coffee grind, and a pumping system for pumping heated water through the coffee grinds.

The machine comprises a coffee output 14 from which the espresso drink (without milk) is output, after the hot water has been pumped through the coffee grinds. The coffee output 14 faces downwardly and is located over a drip tray 16. FIGS. 1A and 1B also show a user interface 18 for receiving user selections, such as for water selection and for other drinks selections. There is also an external water delivery nozzle 20 for delivering water (or steam) from the pump, which has not passed to the brewing chamber. This is termed an output nozzle 20 below.

In addition to an espresso coffee mode for delivering coffee from the coffee output 14, the output nozzle 20 enables a hot water mode and a steam mode. Some of the drinks selections relate to drinks recipes which include frothed milk and therefore require the generation of steam. For this purpose, steam may be provided from the output nozzle 20. There may also be an option for the generation of steam without being part of a drink selection, for example to enable the user to generate heated and/or frothed milk independently of any drink to be made by the machine. This may be described as a milk frothing mode.

This invention relates in particular to a coffee machine having an external hot water output nozzle such as explained above. In the example of FIG. 1, the output nozzle 20 may be used for hot water delivery or steam delivery, depending on a heat setting of the water heater. However, there could instead be separate steam and hot water outlets. There could also be separate heaters, one for producing hot water, the other one or both heaters acting together for producing steam. The delivery of steam or hot water depends on a user selection at the user interface 18. The steam output may be used for heating and/or frothing milk, and the option of a hot water only output gives additional options to the user, for example for making soup, tea, hot chocolate etc.

The operation of the machine in generating an espresso coffee drink is entirely conventional, and the general operation of the coffee machine will not be described further. Furthermore, the illustrated full function espresso machine is only one example of the type of coffee machine to which the invention may be applied. Other types include: a pod or capsule coffee machine, or a portafilter espresso machine, wherein part of the brew chamber is removable from the machine for receiving coffee grinds and manually discharging said coffee grinds after use.

This invention relates to the application of a filter coffee jug to the output nozzle 20 so that a drip filtered coffee function is enabled.

In order to enable a drip filtered coffee function, the water pump of the coffee machine is preferably controlled to deliver a pulsed water flow to the output nozzle 20. The coffee machine has a controller 11 for this purpose.

The output nozzle 20 is located in a docking region 21 for receiving a filter coffee jug. Similarly, a drinks vessel or a milk frothing unit may be provided at the docking region 21.

Figures 2A, 2B, 2C, 2D:
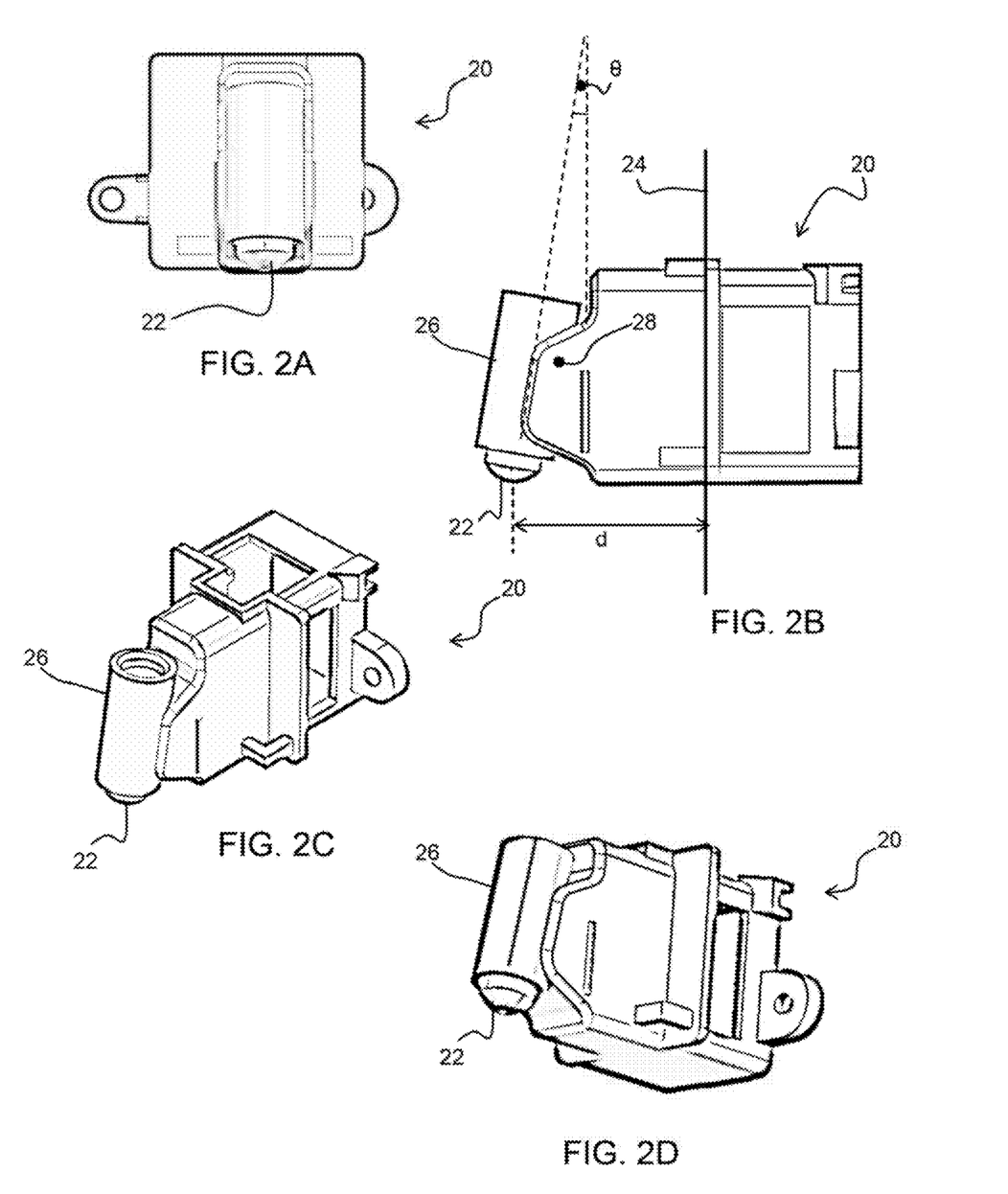
FIGS. 2A to 2D show an example of an output nozzle for steam and hot water.

An example of an output nozzle 20 is shown in more detail in FIGS. 2A to 2D. FIG. 2A shows a front view, FIG. 2B shows a side view, FIG. 2C shows a perspective view from above and FIG. 2D shows a perspective view from below.

The illustrated output nozzle 20 comprises an output tip 22 having an output orifice which faces generally downwardly in use, so that hot water is directed down to a vessel in which it is to be caught, and steam is generated in a safe downward direction.

When steam is delivered, it is provided to a steam inlet of a milk frothing unit (not shown). Many milk frothing units are known (and commercially available) which make use of a steam inlet for the frothing and heating of milk. The milk frothing unit may for example comprise a milk container and a frothed milk output. Alternatively, the milk frothing unit may comprise a milk frothing tube (cappuccinatore, pannarrello).

The output tip 22 may be spring-loaded or otherwise elastically deformable or retractable so that it deforms or retracts when a unit is docked at the docking region 21, such as a filter coffee jug (in accordance with the invention) or a milk frothing unit (as is already known), and is in this way biased (elastically, by gravity or otherwise) to provide a seal. The tip 22 may thus function as a retaining mechanism between a docked unit and the output nozzle, as well as ensuring a sealed connection between the two.

Hot water may be delivered either to a docked filter coffee jug or it may be provided by the output nozzle 20 directly to the exterior of the drinks machine for collection in a drinks vessel.

FIG. 2B shows that the output nozzle 20 may be directed downwardly with an offset to the vertical of an angle $\theta$ which is for example less than 30 degrees, for example less than 20 degrees, such as 15 degrees. The nozzle 20 is angled away from an external face, here the front face 24 of the machine, from which the output nozzle projects. Thanks to such angle $\theta$ the nozzle does not need to project as far as the center of a hot water receiving vessel (e.g. mug). The projection distance d is for example less than 4 cm, for example less than 3 cm, or even less than 2 cm.

In the particular example shown, the output nozzle 20 has an output tube 26 which is pivotable about an axis 28, and having the output tip 22 at its lower end. The output tube 26 may be rotatable about this axis 28 between a first direction which is offset from the vertical, and a second, different direction when a unit is docked. The second direction may be more vertical than the first direction and indeed it may be fully vertical. This second orientation is intended to be more compact, and may be used when the output nozzle 20 is coupled to a docked unit so that the unit can dock as closely as possible to the machine. This in turn enables a small drip tray 16 to be used to catch hot water spillage, frothed milk spillage, and filtered coffee spillage, as the case may be.

The output nozzle 20 may be rotatable in other directions, for example sideward which may in particular be advantageous if used with a cappuccinatore.

Figure 3A:
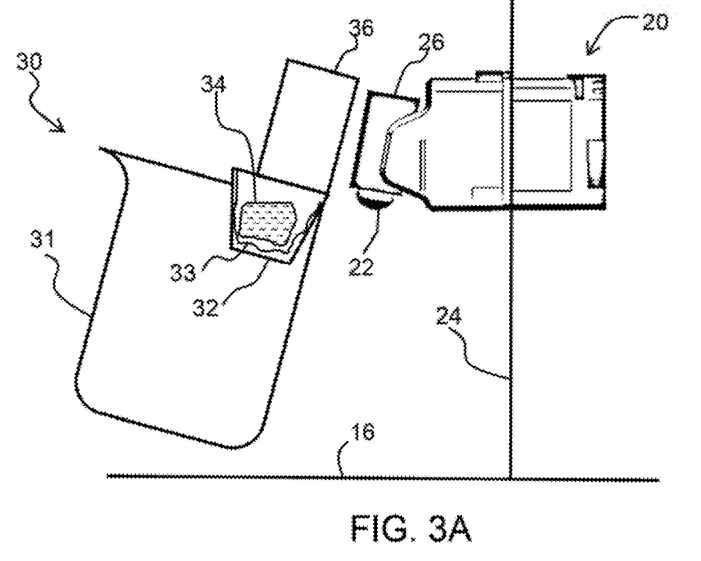
FIGS. 3A and 3B shows how a filter coffee jug can be attached to the output nozzle, to enable drip filtered coffee to be produced.
Figure 3B:
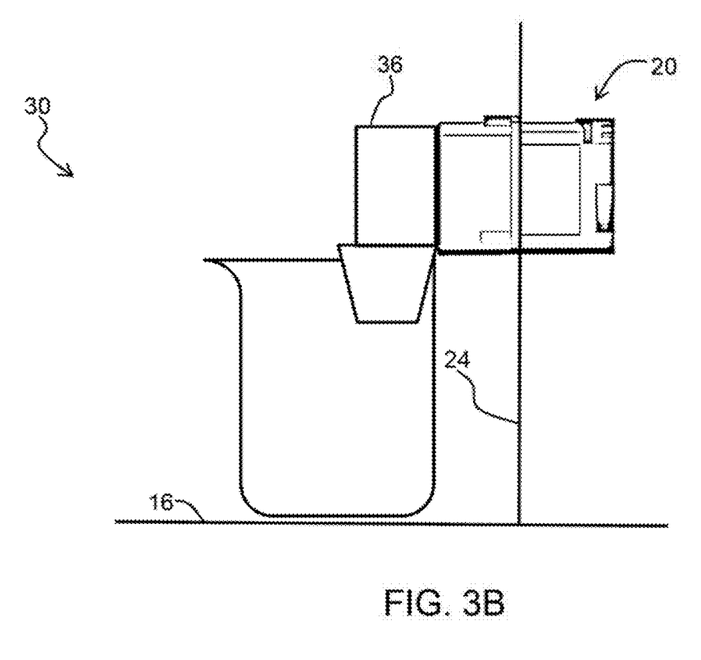

FIGS. 3A and 3B show a coffee jug 30 comprising a vessel 31 and a filter holder 32 for holding a paper coffee filter 33 and contained coffee grinds 34. The coffee jug 30 and the output nozzle 20 comprise complementary coupling features to allow the coffee jug and the external water delivery nozzle to be coupled and decoupled. This may be a click-on and click-off function.

The coffee jug has as its coupling feature a receiving chamber 36 which fits over the output nozzle 20 to make alignment of the coffee jug 30 simple for the user. The output tube 26 of the output nozzle 20 may be considered to be the coupling feature, in that the chamber 36 is a push fit over the output tube 26.

FIGS. 3A and 3B show how the coffee jug 30 can be docked to the machine. It is approached at an angle so that the receiving chamber 36 aligns with the output nozzle 20. When the receiving chamber 36 is pushed over the output tube 26 of the output nozzle 20, the output tip 22 retracts against its spring, elastic, gravity or other bias. The output tip is then received in a recess internal to the receiving chamber 36 so that the orifice of the output tip 22 is aligned with (and optionally also sealed against) a water inlet of the filter holder. This also connects the two parts together, although other or additional snap fit or push fit connection arrangements may be provided.

After engagement, the coffee jug 30 may be rotated downwardly. It then adopts a more flush position against the front face 24. As illustrated in FIG. 3B, the coffee jug 30 may then sit on the drip tray 16. This provides a simple attachment, because the base of the coffee jug 30 is clear of the drip tray 16 during the initial connection, as shown in FIG. 3A. In an alternative embodiment, the coffee jug 30 may be dimensioned to hang with its base above the drip tray 16 in the docked position.

The filter holder 32 is removable from the jug vessel 31. In one example, there is no fixed coupling between them. In this case, the filter holder 32 is attached to the output nozzle 20 in the manner explained above, and the separate jug vessel 31 simply sits beneath in order to catch the drip filtered coffee.

In another example, the jug vessel 31 and the filter holder 32 clip together, so the jug vessel and the filter holder may be manipulated as a single unit, as shown in FIGS. 3A and 3B.

Figure 4:
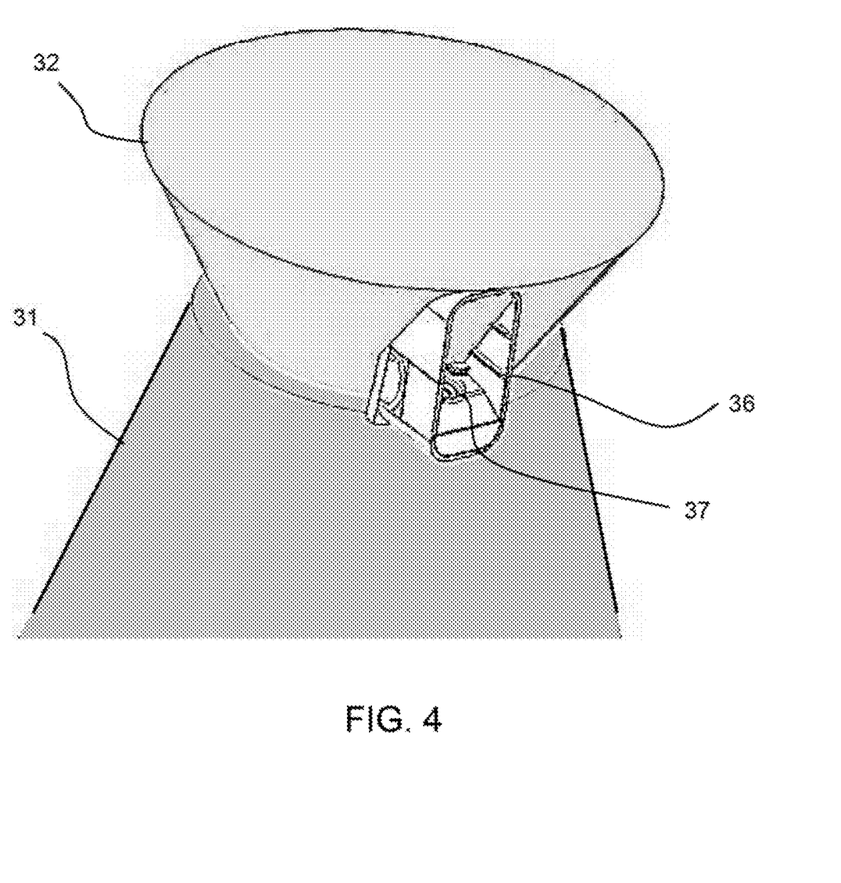
FIG. 4 shows a filter holder and jug design in more detail for fitting to the output nozzle shown in FIGS. 3 and 4.

FIG. 4 shows the filter holder 32 and vessel 31 for attachment to the output nozzle 20 shown in FIGS. 2 and 3. The receiving chamber 36 comprises a cradle which fits over the output nozzle 20 and there is a recess 37 which receives the output tip 22.

In order to create a drip filtered coffee drink, the controller 11 may control the pump to provide a pulsed delivery of hot water to the coffee jug. An amount of water may be selected by the user in advance, or they may start and stop the water delivery process manually.

There are various options for how a drip filter coffee drink may be made.

Figure 5A:
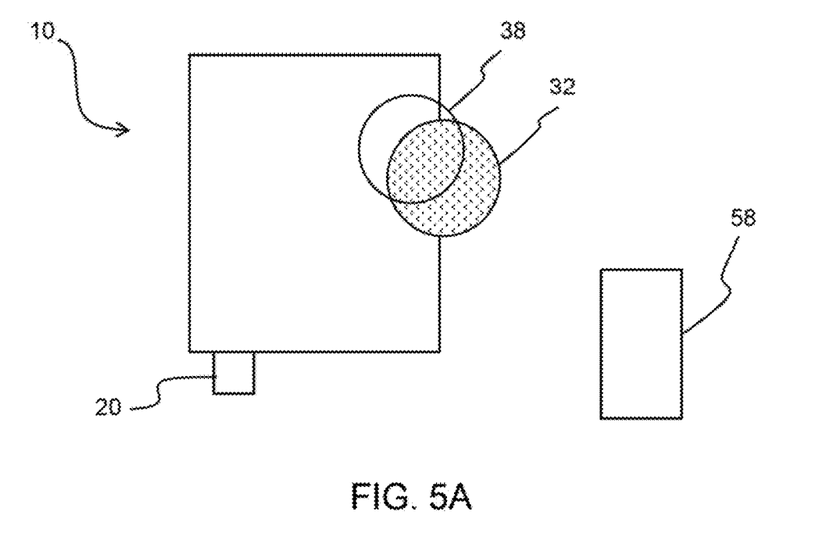
FIGS. 5A and 5B shows a first way to use a full function machine to prepare filter coffee.
Figure 5B:
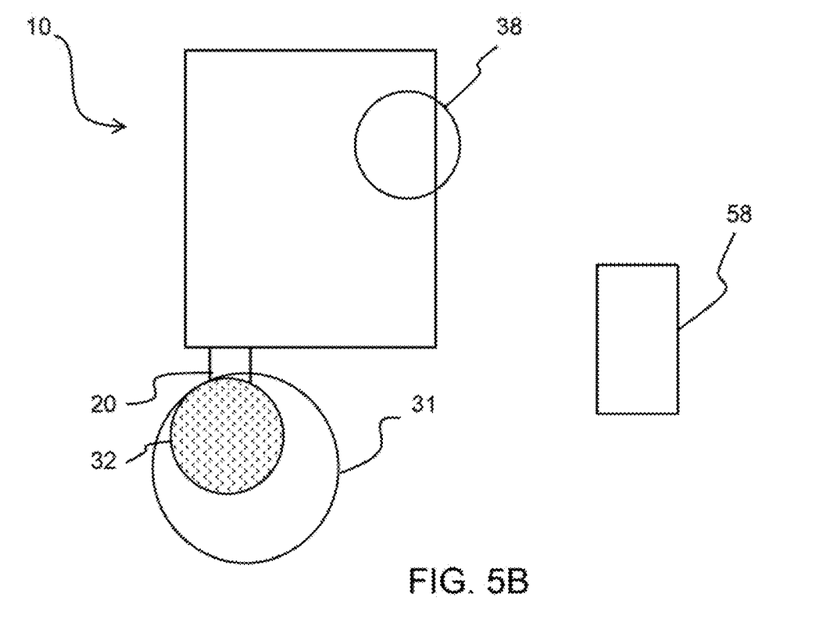

FIGS. 5A and 5B schematically show a first option in which the brewing chamber 58 is removed from the remainder of the machine 10. In FIG. 5A, the filter holder 32 is applied to the grinder 38 and coffee grinds are then provided to the filter holder 32. In FIG. 5B, the filter holder 32 and coffee jug 31 are attached to the output nozzle 20.

In this example, the user makes use of the coffee grinding function of the machine by providing the filter holder at the output of the grinder, by removing the brew chamber from the grinder output.

Figure 6:
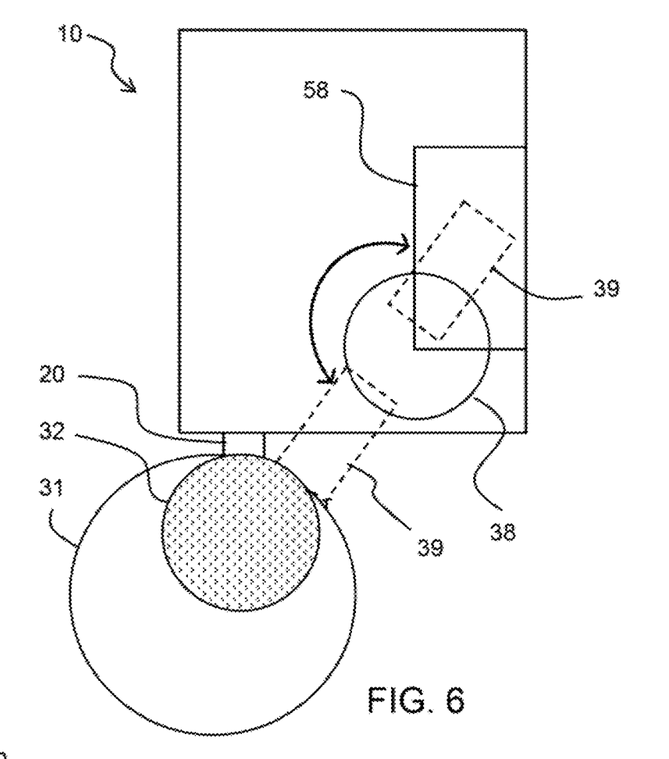
FIG. 6 shows a second way to use a full function machine to prepare filter coffee.

FIG. 6 schematically shows an example in which the grinder 38 has an outlet 39 which can be rotated between a first position in which it feeds the brewing chamber 58 and a second position in which it is directed to an external grinds output where coffee grinds can be caught in the filter holder 32, when the filter holder 32 and coffee jug 31 are already at the receiving position, coupled to the output nozzle 20.

More generally, the coffee grinder may have a first outlet to the brewing chamber 58 and a second outlet to an external coffee grinds output 70. These two outlets may be implemented statically (i.e. with two outlets and a valve to select between them) or a single outlet device which is moved between outlet positions, as shown in FIG. 6.

The coffee grinds output may be next to the output nozzle 20, as shown in FIG. 6, so that the coffee grinds and water may be provided with the coffee jug and filter holder in the same position. Alternatively, as shown in FIG. 1B, the external coffee grinds output 70 may be spaced away from the output nozzle 20, and serve to dispense coffee grinds in a coffee filter holder or a portafilter, for use with the illustrated machine or a stand-alone coffee machine.

The output to be used (i.e. to the brewing chamber or to the output chute) is then selected by the controller, by operating a valve or drive arrangement which selects between the two possible output paths, for delivering coffee grinds either to the brewing chamber or to the output chute. The controller determines which path for the coffee grinds in dependence on the mode selected by the user.

Figure 7:
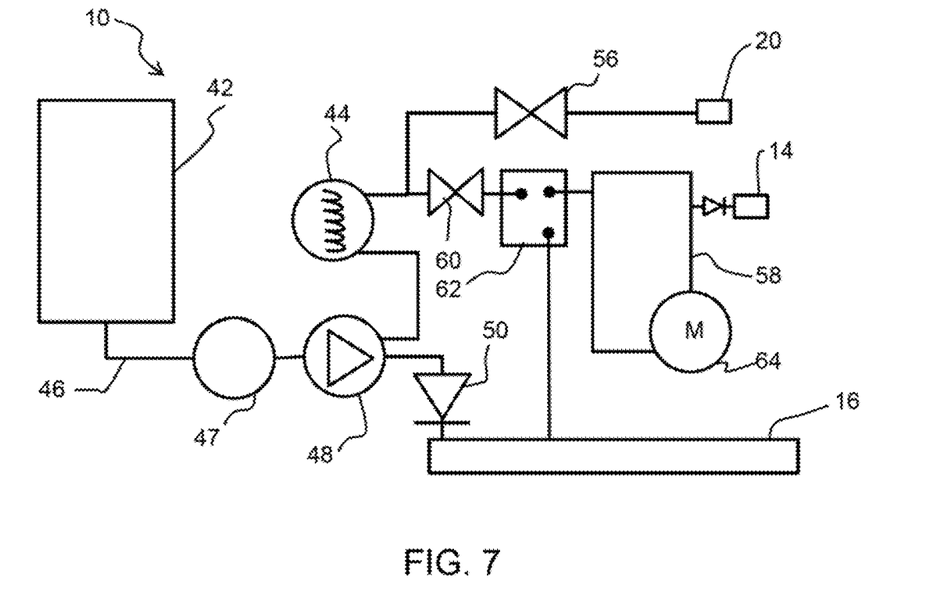
FIG. 7 shows an example of the hydraulic system of the coffee machine.

FIG. 7 shows the internal components of a full function espresso coffee machine, and in particular shows the fluid paths in the system.

The coffee machine 10 comprises a water container 42, a water heater 44 for heating water to generate steam and hot water and having a water heater outlet, and a water pump 48 for pumping the heated water and steam. There is additionally a water dosing flow meter 47.

The pump delivers water to the heater 44. In addition, there is an over-pressure valve 50 from the heater to the drip tray 16 for collection or discharge of waste water.

The heated steam is provided to the output nozzle 20 through a first electronic valve 56.

The coffee output 14 may have an in-line crema valve. The heated water is provided to the brewing chamber 58 through a second valve 60 and also through a control unit 62. The control unit 62 allows water to be discharged to the drip tray 16 for example during cooling down of the heater.

The brewing chamber 58 may be driven by a motor 64 for driving the brewing chamber between different positions. These positions include at least a coffee grinds receiving position and a coffee brew position. Alternatively (not shown), the brewing chamber may be opened and closed manually, via a portafilter arrangement.

The illustrated coffee machine makes use of single heater 44 to selectively supply hot water of about 100° C. (more generally above 95 degrees) for brewing coffee, steam of about 140° C. (or more) for heating and/or frothing milk to the output nozzle 20, and water of about 90 degrees (more generally below 95 degrees) to the output nozzle 20 for filter coffee production, depending on the mode set by the user. The temperature control is implemented by the controller. Alternatively, an additional heater may be provided, to produce steam or help the first heater producing steam.

The machine may have a pressurizing system for the brewing chamber. It may further have a reservoir for receiving coffee beans and a grinder (38 in FIGS. 5 and 6), so that a full bean-to-cup function is provided. Alternatively, the coffee grinds may be supplied in a capsule, pod or the like pre-portioned provision. These elements are not shown as they do not relate to the hydraulic components.

An espresso coffee is typically made by forcing pressurized water to flow through a quantity of coffee grinds. The brewing chamber or part thereof may be removably arranged in order to facilitate emptying and cleaning of the brewing chamber. As shown and mentioned above, when removed some examples enable the coffee holder (drip filter holder, brew chamber, portafilter) to be attached to the outlet 39 or external grinds output 70 of the grinder.

During an espresso making process, the coffee grinds may be compressed to a certain extent. To this end, the machine may for example comprise a piston, which is movably arranged in a cylindrical brewing chamber, and which is capable of sealing an open top side of the brewing chamber.

Movement of the piston controls the extent of compression of the coffee grinds. When the coffee grinds are compressed more and more, a flow through resistance of the coffee grinds increases. During an espresso making process, a brewing pressure at which the process is performed, i.e. a pressure at which the water is conducted through the coffee grind, is determined by the flow through resistance of the coffee grinds.

The brewing pressure is a determining factor for important characteristics of the espresso drink, including the taste, and the texture of a foam layer. The brewing pressure is thus for example controlled by varying a position of the piston and/or the water flow.

When the machine is to prepare an espresso coffee drink, the heater 44 is first heated up to about 140° C. (or more) to supply steam to heat and/or froth milk. The heater is then cooled down to about 100° C. to provide hot water for brewing coffee. During the cooling down phase from 140 to 100° C., water coming from the heater may still be too hot for brewing coffee. This water is discharged to the drip tray 16 by the control unit 62.

To make a drip filtered coffee, a user places a coffee filter paper 33 in the filter holder 32, provides a desired amount of coffee grind in the filter paper, possibly via the bean grinder if included in the coffee machine, and fits the filter holder to the output nozzle 20. A mode of operation is selected for drip filtered coffee, and the controller 11 of the coffee machine then controls the pump and heater to deliver a desired amount of water at the appropriate temperature and water delivery rate.

The temperature or the water delivery rate, or both, may differ as between the espresso coffee mode and the filter coffee mode.

The water delivery may be continuous or pulsed. A pulsed delivery of water may be of interest because the pump has a particular function of water flow output versus counter pressure. The pump is chosen to deliver a good flow rate for espresso counter pressures, such as 3-5 ml/s (more generally above 3 ml/s) at a counter pressure (gauge pressure) of 8 bar (1 bar=100 kPa).

For the drip filter function the counter pressure is approximately zero, which would mean that the pump will provide a flow of around 15 ml/s at full pressure.

To bring the flow down to desired levels, a restriction may be added in the drip filter outlet. This however pressurizes the connector and increases the risk of calcification. The power supplied to the pump may be reduced by phase-cutting. This requires electronic filtering and thus increases cost.

While these are possible options for controlling the water delivery rate, which are within the general concept underlying the invention, it is instead preferred to provide cycled control of power to the pump, i.e. to provide a pulsed output flow. This is a cost-effective solution. Furthermore, the resulting pulsed sound is appreciated by users.

Thus, for the espresso function at full power, a flow rate may be provided of 3-5 ml/s (more generally above 3 ml/s) at 8 bar counter pressure (gauge pressure) whereas for the drip filter function, a resulting flow rate may be 1-2 ml/s (more generally below 2 ml/s) at 0-1 bar counter pressure (gauge pressure).

The coffee maker may comprise any suitable type of water heater for heating the water, for example a thermoblock or through flow heater.

The invention is of particular interest to fully automatic coffee machines as described above that create a coffee beverage by automatically grinding coffee beans, compressing the coffee, and pumping hot pressurized water through the coffee. Furthermore, such coffee machines have the possibility to create milk-based beverages by frothing milk by means of steam. These machines are known as full function bean-to-cup espresso machines. However, the invention can be applied generally to any drinks machine which has an internal coffee brewing chamber as well as a hot water outlet.

For example, the invention may be applied to a capsule or pod-based system which receives pre-compressed coffee capsules or pods, or to a portafilter espresso machine, or to a machine which receives pre-ground coffee.

The machine may have an internal or external water reservoir or may be plumbed in.

The example above shows only one possible connection scheme between the filter holder 32 and the output nozzle 20. Any suitable coupling or male-female connector may be used. The example shows coupling features which provide a fixed connection. However, the coupling features may instead function simply as alignment features to make sure the flow from the output nozzle reaches the filter holder, but without need a fluid-tight connection.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A coffee machine comprising:
   a water supply;
   a water heater for heating water;
   a pump for pumping the heated water;
   a controller;
   a brewing chamber for receiving coffee grinds and brewing coffee using the heated water delivered by the pump;
   an external water delivery nozzle for delivering water from the pump which has not passed to the brewing chamber,
   wherein the coffee machine further comprises:
      a coffee jug comprising a filter holder for holding a coffee filter and contained coffee grind,
      wherein the coffee jug and the coffee machine comprise complementary coupling features to allow the coffee jug to be coupled to and decoupled from the external water delivery nozzle, and
      wherein the controller is adapted to:
         implement a filter coffee mode of operation and an espresso coffee mode of operation; and
         control the pump and/or the water heater such as to deliver water to the external water delivery nozzle during the filter coffee mode of operation and to deliver water to the brewing chamber during the espresso coffee mode of operation, at a different water delivery rate and/or a different temperature.

2. The coffee machine as claimed in claim 1, wherein the controller is adapted, in the filter coffee mode of operation, to control the pump to deliver a pulsed water flow to the external water delivery nozzle.

3. The coffee machine as claimed in claim 2, wherein the controller is adapted, in the espresso coffee mode of operation, to control the pump to deliver water, to the brewing chamber, at a higher water delivery rate than during the filter coffee mode of operation.

4. The coffee machine as claimed in claim 3, wherein the controller is adapted, in the espresso coffee mode of operation, to control the pump to deliver water, to the brewing chamber, at a water delivery rate above 3 ml/s and, in the filter coffee mode of operation, to control the pump to deliver water, to the external water delivery nozzle, at a water delivery rate below 2 ml/s.

5. The coffee machine as claimed in claim 1, wherein the controller is adapted, in the espresso coffee mode of operation, to control the water heater to deliver water, to the brewing chamber, at a higher temperature than during the filter coffee mode of operation.

6. The coffee machine as claimed in claim 1, wherein the controller is adapted, in the espresso coffee mode of operation, to control the water heater to deliver water, to the brewing chamber, at a temperature above 95 degrees and, in the filter coffee mode of operation, to control the water heater to deliver water, to the external water delivery nozzle, at a temperature below 95 degrees.

7. The coffee machine as claimed in claim 1, wherein the external water delivery nozzle comprises a coupling feature for coupling to the coffee jug.

8. The coffee machine as claimed in claim 1, wherein the filter holder of the coffee jug comprises a coupling feature for coupling to the external water delivery nozzle.

9. The coffee machine as claimed in claim 1, comprising a bean-to-cup espresso machine comprising a bean grinder.

10. The coffee machine as claimed in claim 9, wherein the bean grinder has an outlet which can be configured to deliver coffee grinds to the brewing chamber and/or to an external grinds output.

11. The coffee machine as claimed in claim 1, wherein the water heater is further controllable to generate steam.

12. The coffee machine as claimed in claim 1, further comprising a steam outlet, wherein the steam outlet is either separate to the external water delivery nozzle, or is the external water delivery nozzle.

13. The coffee machine as claimed in claim 12, further comprising a milk frothing unit for coupling to the steam outlet.

14. The coffee machine as claimed in claim 1, wherein the coupling feature, of the external water delivery nozzle, for coupling to the coffee jug comprises an output tube of the external water delivery nozzle.

15. A coffee machine comprising:
a water heater for heating water;
a pump for pumping the heated water;
a controller;
a brewing chamber for receiving coffee grinds and brewing coffee using the heated water delivered by the pump;
an external water delivery nozzle for delivering water from the pump which has not passed to the brewing chamber,
wherein the controller is adapted to:
implement a filter coffee mode of operation and an espresso coffee mode of operation; and
control the pump and/or the water heater such as to deliver water to the external water delivery nozzle during the filter coffee mode of operation and to deliver water to the brewing chamber during the espresso coffee mode of operation, at a different water delivery rate and/or a different temperature.

\* \* \* \* \*